May 28, 1968 B. W. BRUNSON ET AL 3,385,237

METHOD AND APPARATUS FOR APPLYING TOPPING TO WAFERS

Filed Dec. 2, 1965

INVENTORS
DICK SPORTE
WILLIAM R. DUFENDACH
BRUCE W. BRUNSON
BY Price & Heneveld
ATTORNEYS

United States Patent Office 3,385,237
Patented May 28, 1968

1

3,385,237

METHOD AND APPARATUS FOR APPLYING TOPPING TO WAFERS

Bruce W. Brunson, Dick Sporte, and William R. Dufendach, Grand Rapids, Mich., assignors to Werner Machinery Company, Grand Rapids, Mich., a corporation of Michigan Filed Dec. 2, 1965, Ser. No. 511,131
8 Claims. (Cl. 107—54)

This invention relates to a method and an apparatus for automatically applying topping to objects such as wafers, cookies and the like, and more particularly to means of this nature for automatically applying topping to each wafer in a plurality of generally parallel moving rows thereof, in a continuous process.

In manufacturing cookies and the like, it is often desirable to apply a topping substance such as frosting, marshmallow, and the like to a variety of generally flat wafers made of such substances as cookie dough or cake. While a variety of more or less automated processes have long been available for producing the wafers in large numbers, the same is not true for the step of applying the topping to the wafers, since greatly different problems clearly are present in the two different situations. In the case of applying a topping substance to a wafer the basic problems are those of properly aligning the wafers with the depositing means during the topping process and of controlling the operation of the topping apparatus to correctly deposit the proper amount of topping directly atop each individual wafer. Thus, at one time the topping process was carried out as a partially manual operation, with individual workers attending to matters of alignment and topping depositing. However, several generally workable devices have since devised for speeding this process by performing it mechanically.

Basically, such devices operate by supplying the wafers from vertically disposed cylinders or the like in which many wafers have been stacked, with individual wafers being sequentially dispensed from the bottom extremity of each such cylinder, generally by pushing the individual wafers out of the bottom of the cylinders and onto a moving conveyor member. In this manner, if a number of cylinders are used, the individual wafers from each such cylinder may be given any desired alignment when transferred to the conveyor member, since the cylinders themselves may be arranged in a desired alignment. Consequently, the wafers are aligned when placed upon the conveyor, and they are carried thereby in this same alignment to a topping-depositing head, where they are covered or coated. Generally such a topping head is mounted to move simultaneously with the conveyor for a brief distance, so that the conveyor need not be stopped beneath the head while it is depositing topping material onto the wafers.

Devices of the foregoing nature, while useful in and of themselves, nonetheless fail to achieve maximum efficiencies due to the fact that the wafers must first be stacked in the vertical cylinders or columns before they can be supplied to the topping machinery. This represents a time-consuming and cost-elevating extra step, but a step for which there was no alternative which produced any more satisfactory result.

Accordingly, it is a major objective of the present invention to provide an apparatus for automatically topping wafers and the like in which the wafers need not first be vertically stacked, but instead need only be supplied on a moving belt or the like, either in separate individual columns or in rows in which the wafers are at least partially aligned laterally. Further, the topping apparatus of the invention provides a new control system by which different steps in the topping process are carried out simultaneously in an integrated and correlated manner, thus providing further increased efficiency and additionally desirable results.

2

The foregoing major objectives of the invention, together with numerous other objects and the many advantages provided thereby, will become increasingly apparent to those skilled in the pertinent art following a consideration of the ensuing specification and its appended claims, particularly when taken in conjunction with the accompanying illustrative drawings setting forth a preferred embodiment of the invention.

Briefly stated, the present invention provides apparatus for automatically applying a topping substance to a succession of individual wafers or other objects in a continuous moving column thereof. Basically, the apparatus comprises conveyor means for moving the objects in a given direction, means for detecting the passage of objects moving therebefore, a topping-depositing head positioned over the conveyor means and oriented over a preselected location relative thereto, an aligning structure for accurately locating objects on the conveyor means in a position to be moved by the conveyor into the said preselected location, and means responsive to the said object-detecting means for actuating said topping head to deposit topping material upon an object located within said preselected location.

Figure 1:
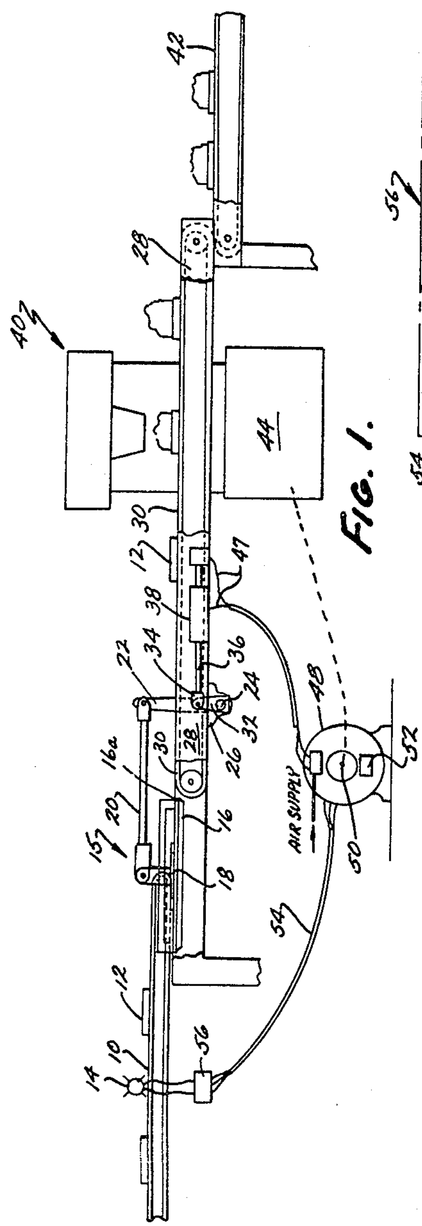
FIG. 1 is a fragmentary side elevational view of a preferred composite structure for carrying out the complete topping process.
Figure 2:
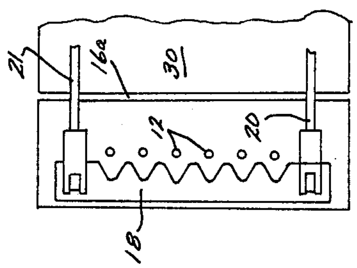
FIG. 2 is an overhead plan view showing details of certain of the structure of FIG. 1.

Referring now in more detail to the drawings, the composite structure used in the invention is shown in FIG. 1. This includes a supply conveyor 10 which moves a series of spaced wafers 12 past an optical scanning means sensor 14, as for example a photocell, toward an aligning structure, seen generally at 15. The latter structure includes basically a stationary conveyor position provided by a dead plate 16 (FIGS. 1 and 2) and a pusher plate 18, which is arranged to move horizontally relative to the dead plate. The dead plate 16 is merely a generally flat, horizontally elongated plate which is positioned just below the end of the supply conveyor 10, whereas the pusher plate 18 is regularly notched with a series of generally V-shaped troughs extending across substantially its entire length. It is to be understood that the specific number of such troughs or cutouts may be varied to suit particular operating conditions, but that the pusher plate should have one such trough for each column of wafers being moved upon the surface of the supply conveyor 10. That is, it is contemplated that the wafers 12 will be positioned atop the supply conveyor 10 in generally well defined lateral rows, and that the pusher plate 18 will have one V-shaped trough for each wafer in such a row.

Tie rods 20 and 21 are connected to the opposite ends of the pusher plate, and means are provided for reciprocating the tie rods and pusher plate lengthwise relative to the supply conveyor. Such means preferably is provided by driving arms such as 22 (FIG. 1) connected to the other end of the tie rods 20 and 21. The driving arms are mounted for reciprocating rotary movements upon a shaft 24 journaled within a desired pillow block 26 secured to the frame portion 28 of a topper conveyor 30. The shaft 24 is in turn driven by a linkage 32 which is connected by a coupling 34 to the operating piston 36 of an air cylinder 38 of a conventional type, which is also mounted to the topper conveyor frame 28. From this it will be clear that upon actuation of the air cylinder 38, its operating piston 36 will be moved horizontally to rotate shaft 24 and drive the tie rods 20 and 21 horizontally, thus effecting horizontal movement of the pusher plate 18 attached thereto.

The topper conveyor 30 moves the wafers 12 beneath and past a topping-depositing head structure 40, by which each individual wafer receives a predetermined quantity of topping. Following this, the finished wafers are moved to a packaging station by a desired carry-off conveyor 42, seen at the right in FIG. 1. As the figures illustrate, the topper conveyor 30 is separate from the supply conveyor 10 and carry-off conveyor 42, and consequently the speed of the topper conveyor may be varied independently to adjust the timing with which the wafers are brought beneath the topping head 40. The topping head 40 is of a type well known in the art which in essence is a remotely actuable manifolding structure having a desired number of discharge ports through which topping may be applied to objects in alignment beneath the ports. As is known in the art, topping heads such as this are typically movably mounted so that they first travel horizontally with the wafers in alignment there-beneath while simultaneously rising slightly away from and above the wafers while topping them, and they then return back upstream relative to the conveyor to the point of origin, where they descend downward to await the arrival of the next successive wafer. Since mechanisms for mounting topping heads in this manner are well known in the art and as such form no part of the present invention, the mounting mechanism in FIG. 1 is merely indicated at 44.

Mounting mechanism 44 is coupled by conventional means to a driving power source, in this case an electric motor 48, which serves to drive the mounting mechanism. Consequently, the topping head 40 is driven in the desired manner upon energization of the motor 48. In the present case, the preferred arrangement is for the motor and mounting mechanism to drive the head through one complete cycle of its operation with each revolution of the drive shaft of the motor, seen at 50. Thus, as will be apparent, the motor should be switched on with the arrival of each successive row of wafers 12 at the point where the topping head 40 begins its cyclic motion. The manner in which this control is accomplished will be seen subsequently. It should here be noted, however, that the motor 48 is equipped with a proximity switch means 52 which is actuated by a portion of the shaft 50 (such as a lobe or slug secured thereto, not specifically shown) at a particular point in each revolution of the shaft. Further, as FIG. 1 indicates, an air supply is introduced to a cam-actuated valving chamber which is coupled to the air cylinder 38 by appropriate conduits 47. This arrangement is such that at a first given point in the rotation of the drive shaft 50 the valving member 46 actuates the cylinder 38 to extend its piston 36 and at a second point actuates the cylinder to retract its piston. Finally, electrical power leads 54 from the optical scanning means 14 and control circuitry 56 (to be described subsequently) associated with the scanning means connect to the motor 48, and it is in this manner that the actuation of the motor is controlled.

Figure 3:
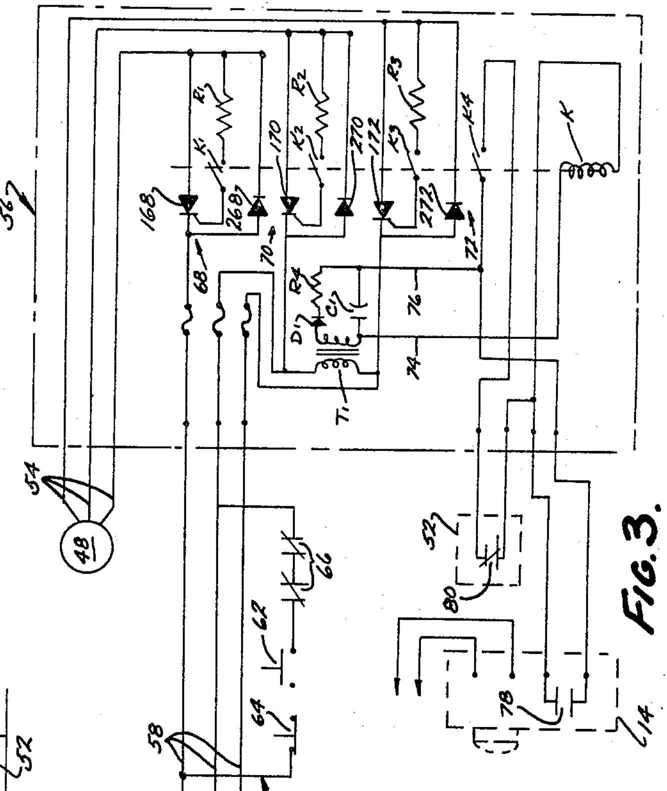
FIG. 3 is a schematic circuit diagram illustrating the preferred control circuitry for the invention.

The electrical interconnections of the drive motor 48 and its controlling circuitry 56, together with the optical scanning means 14 and the proximity switch means 52 are all seen in detail in FIG. 3. In the preferred embodiment shown, the drive motor 48 is a three-phase AC motor, and appropriate three-phase input power for energizing the motor is initially supplied to control circuitry 56 upon the conductors collectively labeled 58 leading into the control circuit. A typical starting shunt circuit 60 is connected across two of the input power conductors 58 and includes a start switch 62, a stop switch 64, and overload contacts 66 connected in the manner shown.

The three input power leads each connect to a semiconductor switching branch 68, 70, and 72, respectively. Each such switching branch includes a series-connected controlled semi-conductor rectifier 168, 170, and 172, respectively, with a diode 268, 270, and 272, respectively, connected in parallel across each controlled rectifier. The gate terminal of each controlled rectifier is connected through a series relay contact K–1, K–2, and K–3, respectively and a series load resistor R1, R2, and R3, respectively, to the cathode of each of the diodes and also to its own anode terminal, from which a connection is made via conductors 54 to the drive motor 48.

The proximity switch 52 and the output leads from the optical scanning means 14 are interconnected in the manner shown in the schematic and in turn connected to yet another set of relay contacts K–4 and also to the actuating coil K for the relay. Additionally, a step-down transformer T1 is connected across two of the input power leads 58 within the control circuitry 56, and the secondary winding of this transformer includes a rectifying diode D1, a load resistor R4, and a filtering capicitor C1 which form a single wave rectifying circuit. This circuit is connected to relay contact K4 and also to the relay coil K.

The operation of the control circuitry 56 and the components controlled thereby is as follows. Initially, the start switch 62 is closed so that the three semiconductor switching networks 68, 70, and 72 are energized. At this point it will be observed that none of the three controlled rectifiers have been gated, since the relay contacts in each gating circuit are initially open. Consequently, although half cycles of current are passed through the diodes 268, 270, and 272, the drive motor 48 is not energized until such time as the relay K becomes actuated. This relay is itself energized from the secondary winding of transformer T1. While one conductor 74 of the secondary circuit is connected directly to the relay coil K, the other conductor 76 thereof is connected to relay contact K4, which is initially open, and to a normally open set of switching contacts 78 within the photocell 14. Consequently, the relay coil is initially de-energized.

When the photocell 14 is tripped by the passage of a wafer therebefore upon the supply conveyor 10, its contacts 78 temporarily close. This completes a circuit through these contacts and through the relay coil K, thereby energizing the relay and causing its contacts to be closed. This immediately gates the controlled rectifiers 168, 170, and 172, thereby energizing the drive motor 48 and causing it to begin to turn. Additionally, however, relay contact K4 is also closed, and this completes an alternate path for energizing the relay coil K through the normally closed contacts 80 within the proximity switch means 52. Consequently, although the photocell 14 is tripped only momentarily to close its internal contacts 78, once the relay has been actuated it will remain in an energized state until the proximity switch means 52 is actuated to open its contacts 80, thereby de-energizing the relay coil K and causing all four sets of relay contacts to once again open, thereby stopping the motion of the drive motor 48.

The operation of the composite automatic topping mechanism as controlled by the circuitry 56 is as follows. The cookies or wafers 12 are formed and baked in a continuous succession elsewhere and steadily moved toward the topping apparatus by the supply conveyor means 10. The wafers 12 are usually in slightly irregular but generally laterally aligned rows, and as each such row is moved to the end of the conveyor 10, it is deposited upon the dead plate 16, which provides a stationary position between the supply conveyor 10 and the topper conveyor 30. The pusher plate 18 is then actuated, and it moves horizontally forward over the dead plate. Each of the wafers in the irregular row resting upon the dead plate is thus engaged within one of the V-shaped notches or troughs formed in the edge of the pusher plate and, as the latter is steadily moved forward, the wafers are simultaneously moved toward the bottom or vertex of the V-shaped notches and centered therewithin as they are pushed forward across the dead plate. Thus, by the time the wafers are moved to the worward end 16*a* of the dead plate 16 and pushed onto the moving topper conveyor 30 (FIG. 2), they have automatically become arranged in a straight line across the conveyor, with each wafer in the row spaced equidistant from those on either side.

The actuation of the pusher plate 18 by its controlling air cylinder 38 is actually initiated by the optical scanner or photocell 14. Air cylinders may be actuated in several specific ways, depending upon the specific type of cylinder chosen, but the preferred actuation shown herein is accomplished through air valves 46 of a conventional nature which are mounted for actuation by cam rollers (not specifically shown) mounted to the driven shaft 50 of the motor 48. Thus, as the photocell 14 triggers the control circuitry 56 (FIG. 3) to energize the motor 48, the pusher plate 18 will automatically be moved forward to align the row of wafers resting upon the dead plate 16 as it pushes the wafers outward over the edge **16*a* of the dead plate and onto the topper conveyor 30**. The pusher plate will then be returned to its original position through the operation of the air valves upon the cylinder to await the arrival of another row of cookies upon the dead plate.

When the aligned and spaced wafers are placed upon the topper conveyor 30, they are steadily moved toward the topper head 40. As the wafer move into the area in which the topper head operates, they will automatically be properly positioned beneath the discharge ports in the head, since these are in longitudinal alignment with the V-shaped notches or troughs formed in the pusher plate 18. Further, since the movements and operation of the topper head are controlled from the drive shaft 50 of the motor 48, it will be apparent that the operation of the pusher plate and topper head may readily be coordinated such that the spacing between successive aligned rows of wafers upon the topper conveyor 30 corresponds to the cyclic operation of the topper head. Therefore, each succeeding row of wafers aligned by the pusher plate 18 is not only properly positioned laterally relative to the discharge ports in the head, but each row is also properly spaced longitudinally, so as to be in vertical alignment with the head 40 as it begins its forward horizontal motion in unison with the topper conveyor.

Thus, it will be seen that the entire topper apparatus is coordinated. The photocell 14 senses or detects the presence of the foremost wafer in the particular row passing before it and, through the control circuitry 56, switches on the drive motor 48. As has been seen, this actuates the pusher plate 18 such that it moves forward to align and position a different row of wafers resting upon the dead plate 16, to place this row upon the topper conveyor 30. At the same time, the topper head 40 is actuated and is moved in its cyclic path to apply topping to yet another row of wafers which previously has been positioned and aligned by the pusher plate and carried to the topper head by the topper conveyor 30. At a point where both the topper head 40 and the pusher plate 18 have returned to their original positions to await the arrival of the next succeeding row of wafers, the proximity switch 52 will be actuated and will cause the motor 48 to automatically be switched off. Upon the arrival of the next succeeding row of wafers before the photocell 14, the entire cycle will of course be once again repeated. Ideally, the time during which the motor 48 is switched off should be at a minimum, and it will be apparent that the nominal operating speed for the drive motor 48 should be one revolution for every row of wafers that passes a given point in the apparatus. Actually, the drive motor should run slightly faster than this, so that its average speed over the period in which it is running and the period in which it is shut off will closely approximate the wafer row rate.

From the foregoing, it will be clear to those skilled in this art that the present invention provides a novel topping application apparatus which dispenses with the usual requirement of stacking the wafers before applying topping thereto and which operates directly upon the wafers in the irregular moving rows in which they are produced. Consequently, the invention provides a considerable advantage in time and efficiency. Further, the system which has been disclosed is extremely flexible since all of its component assemblies are essentially independent of each other and yet are fully coordinated.

It may well be that the concepts which underlie the present invention are capable of being embodied in specific topping structures which differ from those shown herein, and also that various changes and modifications may be made to the structure which has been shown which do not in any way change the principle upon which the structures are based. Consequently, all further embodiments and the changed or modified structures which utilize the concepts of the invention and are clearly based upon the spirit thereof are to be considered as within the scope of the claims appended hereinafter, unless these claims by their language specifically state otherwise.

We claim:

1. Apparatus for automatically applying a topping substance to individual objects such as cookies and the like in a moving column thereof, comprising in combination: conveyor means for moving said objects in a given direction; means for detecting the passage of objects moving therebefore; a topping-depositing head positioned over said conveyor means and oriented over a preselected location relative thereto; aligning structure operative in response to said object-detecting means for accurately locating objects on said conveyor means in a position to be moved thereby into said preselected location; and mean responsive to said object-detecting means for actuating said head to deposit topping upon an object located within said preselected location.

2. The apparatus defined in claim 1, wherein said conveyor means moves a number of generally parallel rows of said objects in said given direction; wherein said detecting means is arranged to detect the passage therebefore of each such row of objects; wherein said topping-depositing head is oriented over a number of preselected locations relative to said conveyor means; wherein said aligning structure is arranged to accurately locate each object in each such row in a position on said conveyor to be moved thereby into one of said number of preselected locations; and wherein said means responsive to said object-detecting means actuates said head to deposit topping upon each object located within each of said preselected locations.

3. The apparatus of claim 2, wherein said conveyor means includes a stationary portion for arresting the motion of each row of objects, and wherein said aligning structure operates to locate the objects in each row while that row is in said stationary position.

4. The apparatus of claim 3, wherein said stationary portion is provided by a dead plate placed between successive conveyor portions and said aligning structure is a pusher plate which is movable horizontally over said dead plate, said rows of objects being placed upon said dead plate by an upstream conveyor portion and being simultaneously aligned and positioned while being moved from the dead plate to a downstream conveyor portion by said pusher plate.

5. The apparatus of claim 4, wherein the said means for detecting the passage of objects is an optical scanning system which is triggered by the object in each row which is furthest downstream on the conveyor means.

6. The apparatus of claim 2, wherein said means for actuating said topping head includes a motor switched on by said object-detecting means and arranged to shut itself off at a preselected point, such that the length of time said motor is on is directly proportional to the spacing between said rows of objects.

7. The apparatus of claim 6, wherein said object-detecting means includes semiconductor switching circuitry for switching said motor on and off.

8. A method of applying topping to a plurality of individual objects moving in a given direction along a given path and arranged in partially aligned relationship in a plurality of successive rows extending transversely of said direction and also arranged in a plurality of columns extending in said direction; the first step of detecting at one station along said path at least one object in each row; subsequently at a second station located along said path downstream of said first station, the second step of positioning and aligning each object in each successive row while advancing said rows in said direction so that each object will be perfectly aligned with the other objects in its row and with the other previously aligned and positioned objects in its column; at a third station along said path downstream of said second station, the third step of providing a topping-dispensing head and arranging it to operate on said objects which have been previously positioned and aligned in said rows and columns so as to dispense a topping thereon; the initiation of said second and third steps of positioning and aligning and the dispensing of said head being governed by the above said first detection step.

References Cited

UNITED STATES PATENTS

| | | | |
|---|---|---|---|
| 3,072,095 | 1/1963 | Keessen et al. | 118—6 |
| 3,279,423 | 10/1966 | Russell | 118—8 X |

WALTER A. SCHEEL, *Primary Examiner.*

J. SHEA, *Assistant Examiner.*